United States Patent
Desai et al.

(10) Patent No.: US 11,205,962 B2
(45) Date of Patent: Dec. 21, 2021

(54) REAL-TIME SWITCHING PERIOD ESTIMATION APPARATUS AND METHOD

(71) Applicant: Intel Corporation, Santa Clara, CA (US)

(72) Inventors: Nachiket Desai, Portland, OR (US); Harish Krishnamurthy, Beaverton, OR (US); Suhwan Kim, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 16/409,562

(22) Filed: May 10, 2019

(65) Prior Publication Data

US 2019/0273439 A1 Sep. 5, 2019

(51) Int. Cl.
| | | |
|---|---|---|
| *G06F 1/26* | (2006.01) | |
| *H02M 1/14* | (2006.01) | |
| *H02M 3/158* | (2006.01) | |
| *H02M 3/157* | (2006.01) | |
| *H02M 3/15* | (2006.01) | |
| *H02M 1/00* | (2006.01) | |

(52) U.S. Cl.
CPC ............ *H02M 3/1584* (2013.01); *G06F 1/26* (2013.01); *H02M 1/14* (2013.01); *H02M 3/157* (2013.01); *H02M 1/0032* (2021.05); *H02M 3/1586* (2021.05)

(58) Field of Classification Search
CPC ...... H02M 3/1584; H02M 3/157; H02M 1/14; H02M 2001/0032; H02M 2003/1586; G06F 1/26; Y02B 70/10

USPC ........................................ 713/300, 500, 600
See application file for complete search history.

(56) References Cited

U.S. PATENT DOCUMENTS

| | | | | |
|---|---|---|---|---|
| 5,819,075 | A * | 10/1998 | Forsmo | ............... G06F 13/4256 |
| | | | | 713/401 |
| 10,069,397 | B2 | 9/2018 | Vaidya et al. | |
| 2009/0244934 | A1 | 10/2009 | Wang et al. | |
| 2011/0291630 | A1* | 12/2011 | Konstadinidis | ....... H02M 3/157 |
| | | | | 323/283 |
| 2012/0307528 | A1* | 12/2012 | Humphrey | ........ H02M 3/33592 |
| | | | | 363/17 |

(Continued)

FOREIGN PATENT DOCUMENTS

KR 20180088388 8/2018

OTHER PUBLICATIONS

International Search Report and Written Opinion from PCT/US2020/027703 notified Jul. 24, 2020, 12 pgs.

*Primary Examiner* — Michael J Brown
(74) *Attorney, Agent, or Firm* — Schwabe, Williamson & Wyatt, P.C.

(57) ABSTRACT

An apparatus is described which includes a delay-line with reasonably matched delay cells and some logic to ascertain both a correct number of DC-DC converters and interleaving angles or phase offsets. The apparatus measures an operating frequency in real-time in multiples of the individual delay cells of the delay-line. The smaller the period, the higher the load coupled to the DC-DC converters and, therefore the greater the number of DC-DC converters are needed to service the load. The period determines the load and can be used to determine the number of DC-DC converters needed and thereby accomplishing autonomous phase enabling/shedding.

18 Claims, 9 Drawing Sheets

(56) References Cited

U.S. PATENT DOCUMENTS

2013/0335050 A1   12/2013   Fujiwara et al.
2016/0359409 A1   12/2016   Theoduloz et al.
2019/0273439 A1    9/2019   Desai et al.

* cited by examiner

REAL-TIME SWITCHING PERIOD ESTIMATION APPARATUS AND METHOD

BACKGROUND

Multiple power switching converter units are typically connected with their outputs shorted together, or "ganged", to deliver an increased amount of current/power to an output power supply rail. Determining phase separation between the individual power switching converter units is a challenge while minimizing voltage ripple on the output supply node.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
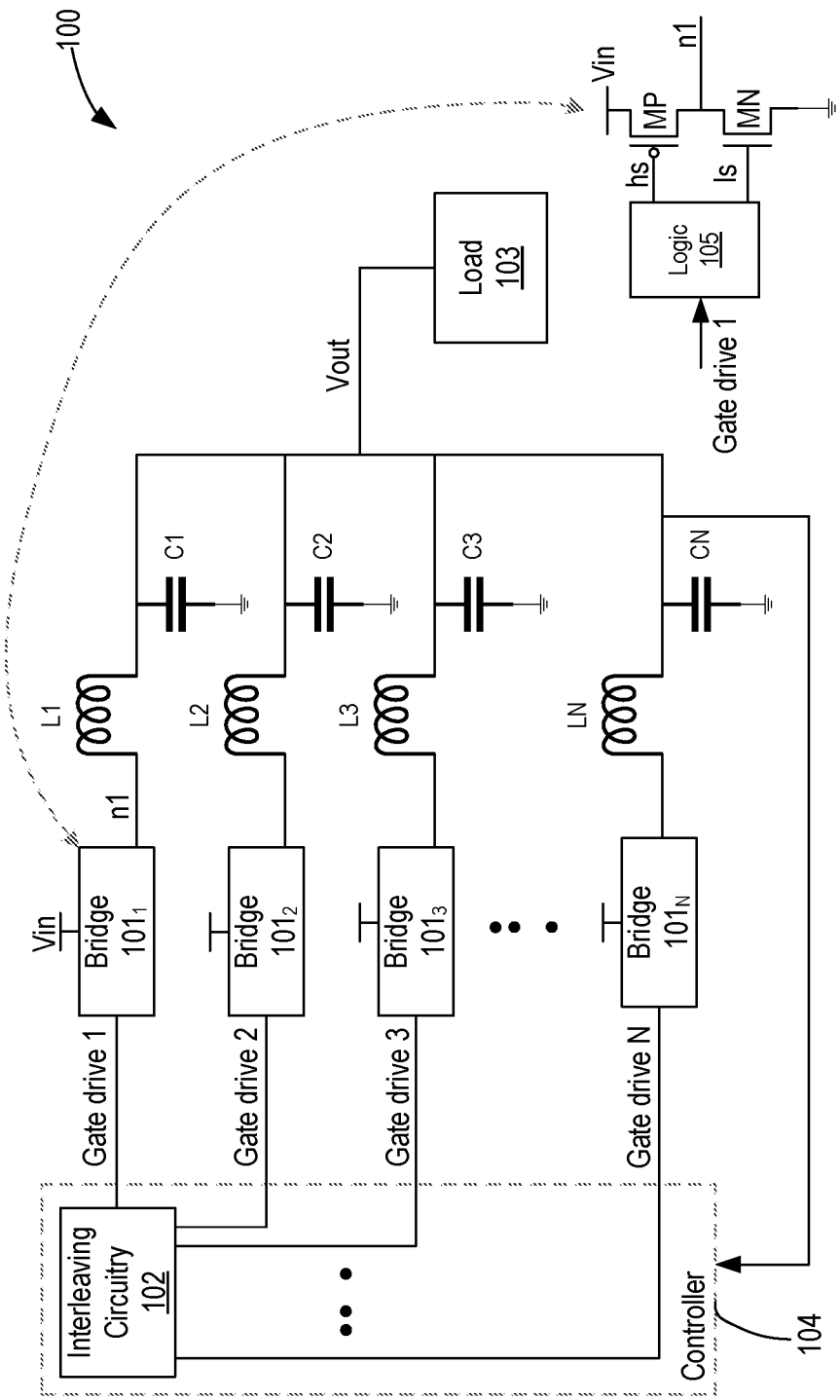
FIG. 1 illustrates a multi-phase DC-DC converter with real-time switching period estimation for appropriate or optimized interleaving, in accordance with some embodiments.

The output voltage on an output power supply rail may exhibit a voltage ripple. This ripple may be due to high-side and low-side switches of the DC-DC converters switching and/or due to change in load conditions. The voltage ripple introduces noise to signals generated by the circuits coupled the output power supply rail. One way to reduce the voltage ripple, and to provide additional power to a load coupled to the output power supply rail, is to phase interleave the bridges of DC-DC converters. For example, in various embodiments, phase offsets are introduced, as opposed to synchronized phases, to the pulse trains for each DC-DC converter bridge to smooth out the ripples on the output voltage on the output power supply rail.

In fixed switching frequency converters, the phase offsets are typically implemented by a time delay calculated by a period and a number of bridges to be ganged or enabled. However, in variable frequency techniques, like Pulse Frequency Modulation (PFM) that may be used in converters operating in Discontinuous Conduction Mode (DCM), the exact switching frequency is not known as the switching frequency is a function of an amount of decoupling and load current. In addition, enabling or disabling a correct number of bridges in a ganged voltage regulation subsystem may be needed to keep the voltage regulation efficiency high and the circuit overheads low to maintain a flat efficiency across a load current profile.

Traditionally DCM and PFM converters operate in a single phase-per-bridge mode. However, converters operating in DCM present an opportunity to deliver current at higher efficiency than Continuous Conduction Mode (CCM) converters at light loads. The efficiency remains flat if these bridges are ganged to deliver larger currents to the output power supply rail than a rating of a single bridge. As such, there is value in ganging multiple of these DCM bridges to deliver a power domain with larger current. Determining the correct phase offset for each bridge, in a multi-bridge or multi-phase DC-DC converter, that result in minimum voltage ripples while enabling a negative feedback control for the DC-DC converter is a challenge.

Some embodiments address the problem of arriving at an appropriate (or optimized) phase offset in a ganged DCM converter by measuring a switching period of a power converter in real-time. Some embodiments describe a scheme for implementing near-ideal interleaving in cases where a control scheme might prevent ideal interleaving. Some embodiments, describe a mechanism to autonomously control a number of phases or ganged bridges to be enabled or disabled based on measurements of the output voltage on the output power supply rail.

The apparatus of some embodiments uses a delay-line with reasonably matched delay cells and some logic to ascertain both a correct number of bridges and interleaving angle or phase offset. An operating switching frequency for a bridge is measured in real-time in multiples of the individual delay cells of the delay-line. The smaller the period, the higher the load and therefore the greater the number of bridges are needed to be enabled. The period determines a load in DCM/PFM and therefore can be used to determine a number of bridges needed and thereby accomplishing autonomous phase enabling/shedding. In an event of a voltage droop (based on a pre-defined threshold), all phases or bridges are enabled to sustain the large load following which the embodiments establish a correct number of bridges and sheds appropriately based on the load. In various embodiments, small deviations from ideal phase offsets of the interleaved stages are applied to keep the interleaved converter operation consistent with the control scheme.

Inappropriate phase interleaving in multiple DCM bridges can result in larger output voltage ripple, which can result in larger power loss in the load domain. To make matters worse, some domains are extremely sensitive to voltage ripple and can prevent a converter from getting into DCM, thereby incurring huge power losses. Further having more bridges enabled than necessary for worst case scenarios can result in larger quiescent current consumption as well as lower efficiency of the power delivery.

By enabling near-ideal interleaved operation in variable frequency controllers, various embodiments enable optimal ripple performance under all or most load scenarios as dictated by the inductor and output decoupling limits. Further, ganging in DCM can allow high efficiency operation for small and medium sized power domains without the need for the CCM converter controller complexity. Autonomous phase enabling/shedding can achieve a flat efficiency across an entire load profile that can improve Hours of Battery Life (HOBL) significantly. Operating in DCM can also improve the response time of the converter to rapid load transients to a single switching cycle, which can lead to faster entry and exit latency into P/C states (power management states, as defined by the Advanced Configuration and Power Interface Specification v. 6.2 released May 2017), enabling better overall user experience with improved snappiness as well as better overall system efficiency. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within ±10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

FIG. 1 illustrates multi-phase DC-DC converter 100 with real-time switching period estimation for appropriate or optimized interleaving, in accordance with some embodiments. Converter 100 comprises bridges $101_{1-N}$ (where N is an integer greater than 1), inductors L1 though LN (where N is an integer greater than 1), load capacitors C1 through CN (where N is an integer greater than 1), interleaving circuitry 102, load 103, and controller 104. Each bridge (e.g., 1011) includes a high-side switch MP (e.g., a p-type transistor), and a low-side switch MN (e.g., an n-type transistor). The high-side switch MP is coupled to an input power supply rail Vin and controllable by switching signal hs (high-side) received at its gate terminal. The low-side switch MN is coupled in series with the high-side switch MP and is controllable by switching signal ls (low-side) received at its gate terminal. A pulse train or gate drive signal (here labeled as Gate drive 1) is received by logic 105 (e.g., buffer) that provides hs and ls signals according to the gate drive signal. Node n1, common to both the high-side and low-side switches, is coupled to an inductor. The circuitry for bridge 1011 is a simplified implementation, and persons skilled in the art may appreciate that other devices can be added to the bridge. For example, current sensing devices can be coupled in parallel or in series with the high-side and/or low-side switches. Other transistors with constant or adjustable bias can be coupled in series with the high-side and low-side switches.

Inductor-based switching power converters operate by creating a square-wave voltage across the inductor (e.g., L1) whose levels are defined by the input (Vin) and output (Vout)

voltages. The square-wave is then filtered using an inductor and a capacitor (e.g., C1) and delivered to load 103. For example, by modulating the voltage at one terminal n1 of inductor L1 as a square wave between Vin and ground using the high-side (hs) MP and low-side (ls) MN switches, respectively, voltage on Vout is maintained or regulated. The converter is said to be operating in Continuous Conduction Mode (CCM) if there is a non-zero current always flowing through the inductor, and in Discontinuous Conduction Mode (DCM) if otherwise.

In some embodiments, the output voltage Vout, on the output power supply rail Vout, is monitored by controller 104. Controller 104 then adjusts the switching frequency of the gate drive signals (Gate drive 1 through N) to control the amount of current supplies to load 103 according to the voltage conduction of Vout. For example, when load 103 demands more power or current, the switching frequency may be increased and/or the duty cycle of the Gate drive signals may increase to provide more current to the inductors and hence to load 103. So as not to obscure the various embodiments, various components of controller 104 are not shown. A person skilled in the art may appreciate that other circuits such as amplifier(s), pulse modulators, wave generators, bias circuits, etc. may be part of controller 104.

One way of controlling a switching converter is to drive both switches (e.g., MP1 and MN1) at a fixed frequency, while adjusting the relative durations (e.g., duty cycles) for which they are on, based on the difference of the output voltage Vout vis-à-vis a set point (e.g., a reference voltage Vref). However, this technique of controlling the converter requires complicated compensators in the feedback loop. It also adds a large fixed component to the power loss of the converter, hurting its efficiency at light loads.

In various embodiments, a number of variable frequency controllers are implemented to address these issues. One example, is a hysteretic controller that uses a hysteretic comparator (not shown) that modulates the switches such that the output voltage Vout oscillates between two programmed levels. Such as hysteretic controller retains CCM operation of the converter but greatly simplifies the controller. Constant-frequency operation is lost because the effective frequency of operation becomes a function of the passives in the converter. Another technique is to run the converter in DCM using a Pulse-Frequency Modulation (PFM) control scheme. In this technique, a comparator is used to sense when the output voltage falls below the set point and when it does, a pulse (or a train of pulses) of inductor current are delivered to the output Vout. Both switches (MP and MN of a bridge) are then turned off and the inductor current is left to remain at zero until the next time the output voltage Vout falls below the set point (e.g., Vref). In this scheme, the operating frequency varies linearly with the load current of the converter.

Operating the DC-DC converter at a fixed frequency does make it easier to gang multiple converters together to deliver power to the same output. In addition to delivering larger power to load 103, interleaving the converters at a relative phase offset of $2\pi/N$, where N is the number of interleaved converters, can minimize (or reduce) the output voltage ripple on Vout. If the converters operate at a fixed frequency, this translates to a fixed time delay that is applied between the gate drive signals of the individual converter bridges. This simplicity of ganging may be lost when the converters operate at variable frequency.

To interleave multiple variable-frequency converter units, the switching frequency is estimated by interleaving circuitry 102 in real-time to calculate the time delays at which the converters (or bridges) are triggered. In some embodiments, interleaving circuitry 102 comprises a delay-line based scheme. One of the converter's control signals, for example, the gate drive signal 1 of bridge $101_1$ is fed into a delay-line comprising identical delay units. The outputs of each of the delay cells is latched by flip-flops at the edge of a common sampling signal. The outputs of the flip-flops can be processed to determine the locations at which the latched values transition from 0 to 1 and vice versa. The converter's switching period can then be computed in terms of multiples of the delay of a single delay cell of the delay-line by computing the distance between two 0 to 1 transitions in the latched outputs. Similarly, the pulse width (e.g., length of time for which the input drive signal is high) of the input gate drive signal 1 can be computed by the distance between a 0 to 1 transition and the subsequent 1 to 0 transition in the latched values. The inductor current pulse width is used to compute the total length of the inductor pulse in DCM. The switching period and the inductor pulse length can be used to compute an off-time between pulses in DCM.

In order to get a better estimate of the switching period, multiple forms of averaging can be used. If the delay-line is long enough, it will have stored information from multiple preceding cycles in the form of multiple 0 to 1 and 1 to 0 transitions in the latched values as one goes down the line. All of these transitions are used to get a better estimate of the absolute time values by averaging out any mismatch between the individual delay stages. Also, previous values of the computed period and pulse on/off times can be stored separately and averaged to get a cleaner estimate. In DCM, if the charge delivered by each inductor current pulse can be known, a long-term estimate of the switching period can be used as a telemetry output to estimate the load current.

In a master-slave configuration, one of the interleaved converters (e.g., bridge $101_1$ and its controller 104) acts as the master and implements the control scheme being used. The other interleaved converters (e.g., bridges $101_{2-N}$ and their associated controllers which here are all lumped as 104) get their drive signals directly from the master converter's controller. So as not to obscure the embodiments, the controllers for each bridge are shown as a consolidated controller 104. However, each bridge may have its own controller (not shown). In that case, each controller may have its own modulation scheme circuitry, amplifier, bias circuits, etc. In some embodiments, interleaving circuitry 102 is shared by the various controllers. In some embodiments, each controller has its own copy of interleaving circuitry 102.

Once the switching period of the input gate drive signal 1 is computed in terms of the number of unit delays, interleaving circuitry 102 is used to calculate the appropriate time offset for each of the interleaved converter stages being used. The output of interleaving circuitry 102 can be used as a select line of a multiplexer that selects between the outputs of each tap of the delay-line to use as its own gate drive signal. For example, interleaving circuitry 102 determines the frequency (e.g., $T_{period}$), duty cycle, and/or other properties of a gate drive signal. The interleaving circuitry 102 then determines the phase offset between a master gate drive signal (e.g., Gate drive 1) and other gate drive signals (e.g., Gate drive 2 through N), which are referred to as slave gate drive signals. The phase offset is selected for each gate drive signal to achieve minimum voltage ripple on Vout while maintaining closed loop operation of the DC-DC converter 100.

While FIG. 1 shows one possible implementation of optimized interleaving, there are other ways this system can be implemented. In some embodiments, the master converter (e.g., bridge $101_1$ and its associated controller) measures the period, computes the appropriate time offset for each slave (e.g., bridges $101_{1-N}$) and uses multiple multiplexers to send each slave its gate drive signal. In some embodiments, the master measures the period, computes the appropriate time offset for each slave and sends it in terms of the number of unit delays. Each slave implements an identical delay-line with a multiplexer and uses the input from the master as the multiplexer select line. In some embodiments, the slaves each implement the delay-line based switching period measurement circuitry along with the multiplexer. For example, each bridge has its associated interleaving circuitry that includes a multiplexer to select the gate drive signal with offset in accordance with a select signal (representing offset) from the master interleaving circuitry. In this example, the master interleaving circuitry merely sends the necessary parameters (e.g., select signals) for each slave to compute its place in the sequence. The parameters can be a total number of bridges or phases enabled, the position of the slave converter and any correction factors to be applied to the computed time delay. Each slave converter uses these inputs to compute which tap of the delay-line to select using the multiplexer.

Figure 2:
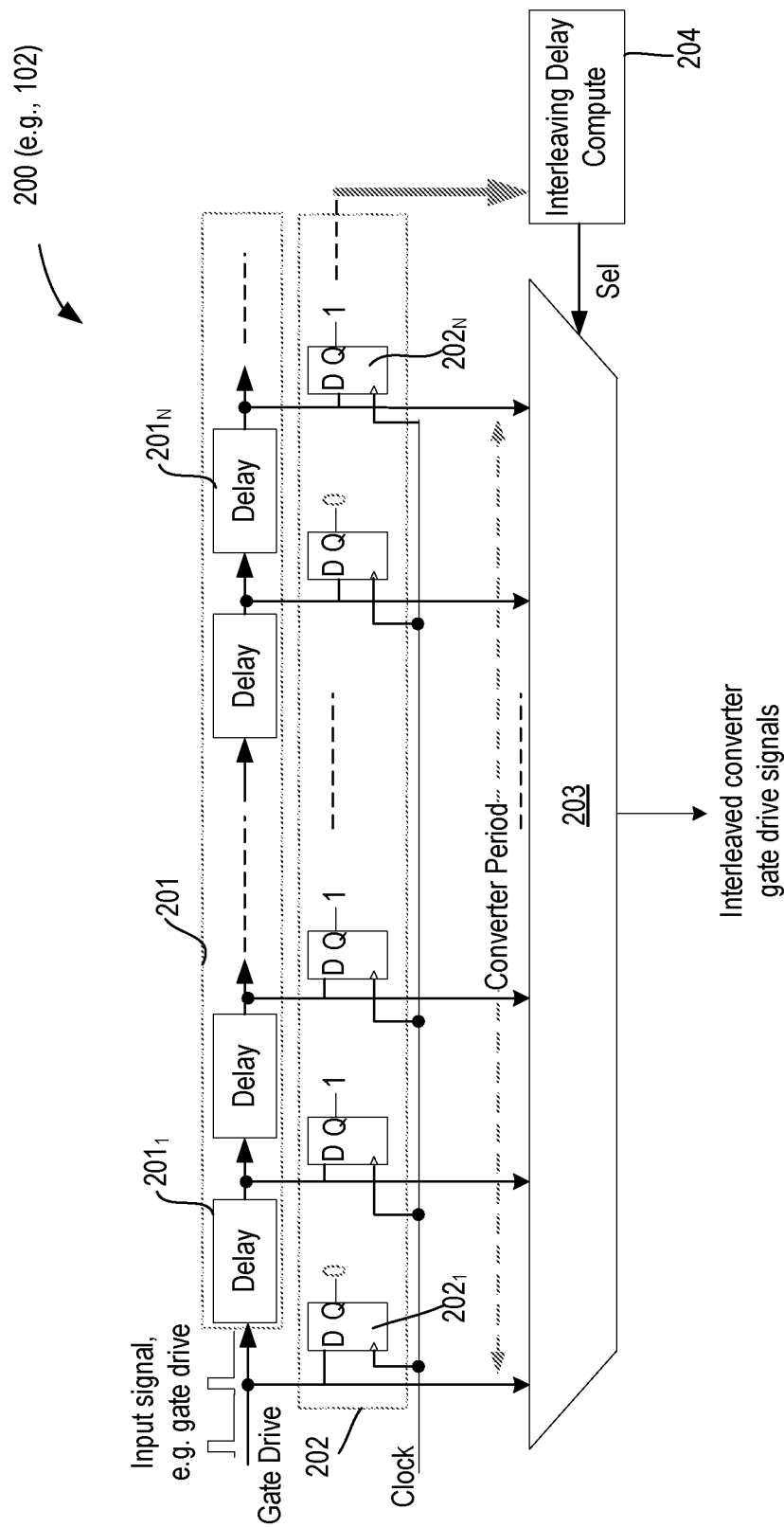
FIG. 2 illustrates an apparatus for real-time switching period estimation, in accordance with some embodiments.

FIG. 2 illustrates apparatus 200 (e.g., interleaving circuitry 102) for real-time switching period estimation, in accordance with some embodiments. In some embodiments, apparatus 200 comprises a delay-line 201, a plurality of sequential units (e.g., flip-flops) 202, multiplexer (mux) 203, and multiplexer select control circuitry 204 (also referred to as interleaving delay computation circuitry). Delay-line 201 comprises a plurality of delay stages or cells $201_{1-N}$ coupled in series. In this example, input of delay cell $201_1$ receives the input signal (e.g., gate drive signal 1) and the output of delay cell $201_1$ is received as input to delay cell $201_2$, and so on. The input (or output) of each delay cell is sampled or latched by a sequential unit. In this example, input of delay cell $201_1$ is sampled by a clock signal Clock using flip-flop $202_1$, input of delay cell $201_2$ is sampled by a clock signal Clock using flip-flop $202_2$, and so on. The outputs of all flip-flops is used by interleaving delay compute circuitry 204 to determine the optimized phase offsets for each gate drive signal to reduce output voltage ripple. For example, the interleaving delay compute circuitry 204 generates a select signal (Sel) to tap the appropriate phase shifted gate drive signal for a bridge. The clock signal can be generated by any suitable clock source (e.g., a phase locked loop, a frequency locked loop, etc.).

The outputs of flip-flops $202_{1-N}$ can be processed to determine the locations at which the latched values transition from 0 to 1 and vice versa. The converter's switching period can then be computed in terms of multiples of the delay of a single delay cell (e.g., $201_1$) of delay-line 201 by computing the distance between two 0 to 1 transitions in the latched outputs. Similarly, the pulse width (e.g., length of time for which it is high) of the input gate drive signal 1 can be computed by the distance between a 0 to 1 transition and the subsequent 1 to 0 transition in the latched values. The inductor current pulse width is used to compute the total length of the inductor pulse in DCM. The switching period and the inductor pulse length can be used to compute the off-time between pulses in DCM.

As discussed with reference to FIG. 1, interleaving circuitry 200 can be implemented in different ways. For example, the entire circuitry 200 can be part of a controller associated with bridge $101_1$, also referred to as the master bridge. In some embodiments, a single delay-line 201 is shared by all bridges $101_{1-N}$, and each slave controller and bridge (e.g., $101_{2-N}$) has a multiplexer which provides the gate drive signal for the bridge of that slave. As such, each gate drive signal is generated with an appropriate offset to achieve minimum voltage ripple on Vout while maintaining a closed control loop with negative feedback.

In some embodiments, the interleaving delay compute circuitry 204 of the master controller measures the period of gate drive signal 1, and computes the appropriate time offset for each slave gate drive signal (e.g., gate drive signals 2 through N) and sends it in terms of the number of unit delays or appropriate select signals for the respective multiplexers. For example, each slave implements an identical delay-line with a multiplexer and uses the input from the master as the multiplexer select line.

In some embodiments, the slaves each implement the delay-line based switching period measurement circuitry along with multiplexer 203. For example, each bridge $101_{1-N}$ has its associated interleaving circuitry 200 that includes multiplexer 203 to select the gate drive signal with offset in accordance with a select signal (representing offset) from the master interleaving circuitry. In this example, the master interleaving circuitry merely sends the necessary parameters (e.g., select signals) for each slave to compute its place in the sequence. The parameters can be a total number of bridges or phases enabled, the position of the slave converter and any correction factors to be applied to the computed time delay. Each slave converter uses these inputs to compute which tap of delay-line 201 to select using multiplexer 203.

Figure 3:
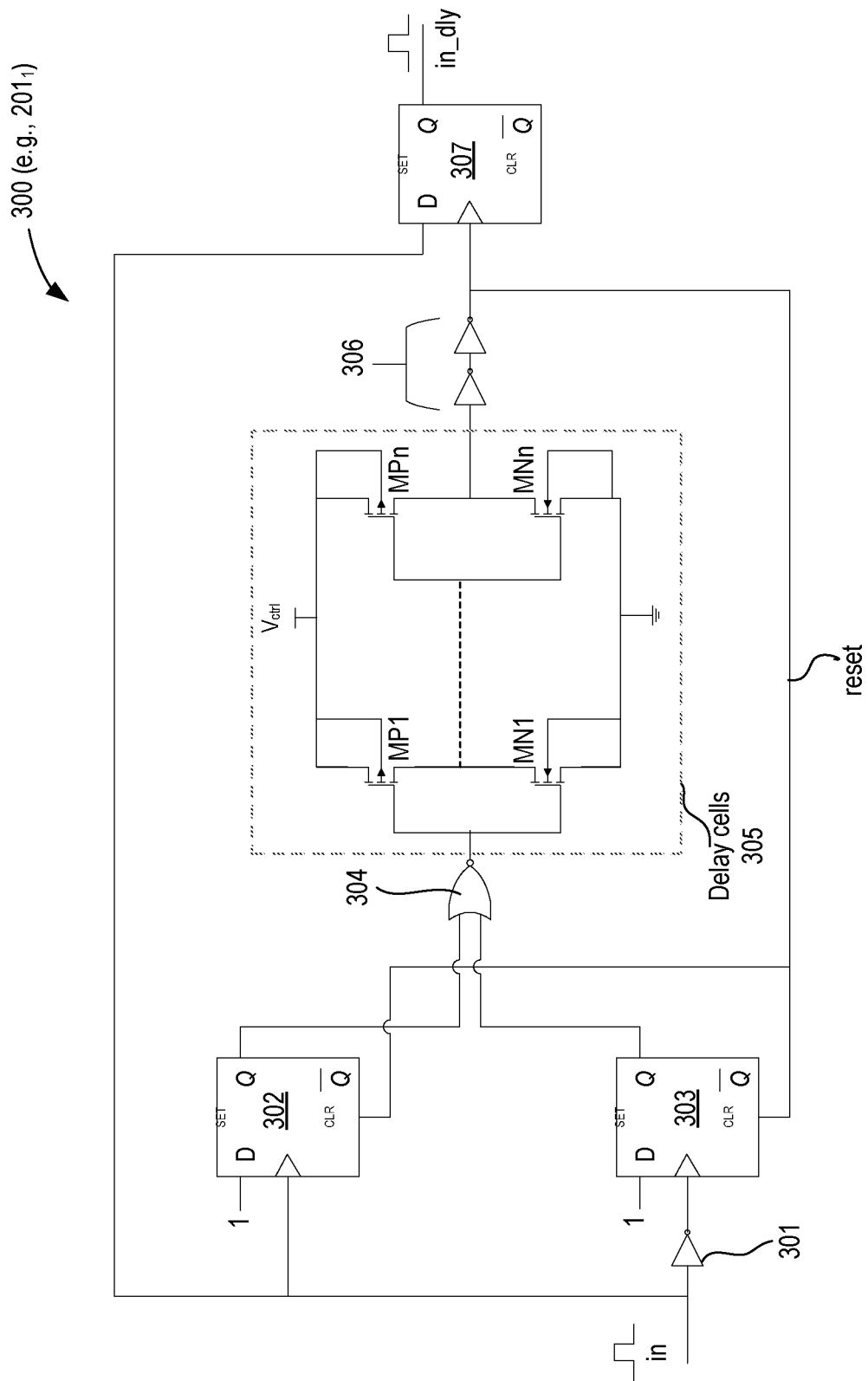
FIG. 3 illustrates a sequential delay cell with symmetric rising and falling edge delays, in accordance with some embodiments.

FIG. 3 illustrates sequential delay cell 300 (e.g. $201_1$) with symmetric rising and falling edge delays, in accordance with some embodiments. Delay lines in timing circuits are typically implemented by inverter chains that are powered by a variable supply voltage. The lower the supply voltage, the larger the delay of the delay line. This technique, however, usually produces different delays for rising and falling edges of the input. The different delays may not be an issue for signals where the timing only relies on the accuracy of one edge, like most clock signals in digital circuits. However, these delay lines may not be suitable for delay line 201, for example, in applications where the pulse width is important. In a multi-phase switched power converter, where one phase is driven by a pulse width modulated (PWM) controller and the gate signals for bridges is derived using a delay line that interleaves the converter phases, having equal delays for rising and falling edges is desired. Delay cell 300 provides strictly bounded delay variation for both positive and negative signal edges.

In some embodiments, delay cell 300 uses a sequential circuit to identify the type of incoming edge that needs to be delayed (rising or falling). Irrespective of the edge, delay cell 300 activates the same delay module, in accordance with various embodiments. Once the required delay elapses, the same edge is created at the output of cell 300. Thus, both edges of the incoming signal see exactly the same delay.

Delay cell 300 allows power converters to make use of a well-controlled symmetric delay generator that can generate gate drive waveforms for multi-phase converters while maintaining a pulse width, and hence the duty cycle. As such, delay cell 300 lowers the cost of implementing multi-phase PWM generators, which can take up significant area/power based on its operating conditions and implementation.

In some embodiments, delay cell 300 comprises inverter 301, input flip-flops 302 and 303, combinational logic 304

(e.g., NOR gate 304), delay cells 305 (e.g., inverters), buffers 306, and output flip-flop 307.

In various embodiments, input-side flip-flops 302 and 303 sample the input signal in (e.g., input to a delay cell $201_1$). Both rising and falling edges on the input "in" produce the same edge (in this case a falling edge) that is passed through an odd number of inverter delay stages of circuitry 305 that can be implemented with a lower supply voltage or with current starving inverters. In this example, each delay cell of 305 is shown as an inverter having p-type device MP1 coupled in series with an n-type device MN1. Any odd number of delay cells can be coupled in series such that 'n' of MPn and MNn is an odd number. As mentioned above, the inverters can operate at a different power supply Vctl and/or with current starving devices (not shown). Once the input edge reaches the end of the delay-line 305, it is used latch an output-side flip-flop 307 with the value of the input, thus triggering the same edge at a fixed delay. The input-side flip-flops 302 and 303 are then reset to wait for next edge. Due to its sampled nature, the delay of each cell is kept below the smallest pulse width at the input.

Delay cell 300 restricts the difference between the rising-edge and falling-edge delays to the delay of inverter 301 plus any mismatch between the two input-side flip-flops 302 and 303. This eliminates the trade-off between the single-stage delay vs. the total power that is seen in the conventional inverter chain delay line.

Figure 4:
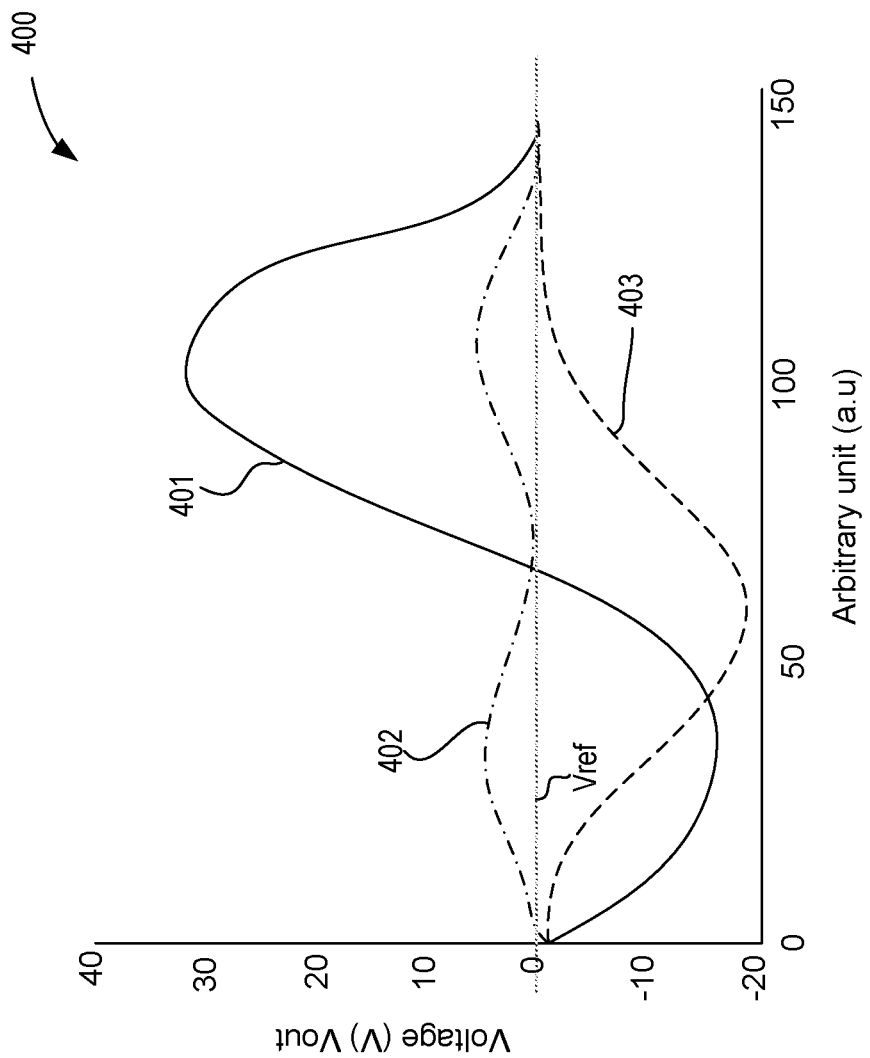
FIG. 4 illustrates a plot showing output voltage waveforms for different 2-phase interleaving cases.

FIG. 4 illustrates plot 400 showing output voltage waveforms for different 2-phase interleaving cases. If multiple converters operating in DCM using a PFM control scheme are being interleaved, ideal interleaving phase offsets from the standpoint of minimizing output ripple on Vout can result in waveforms that render it incompatible with the PFM control scheme. For example, plot 400 shows output voltage waveforms (ac-coupled) for 3 different phase offsets for a 2-phase converter—no interleaving (401), ideal interleaving for minimum ripple (402, 0.5× of switching period), and an intermediate phase offset (403, 0.375× of switching period). Plot 400 shows the benefits of ideal interleaving over the zero phase offset case by reducing the voltage ripple by approximately 10×. However, in the ideal interleaving case, the output voltage rises above the reference Vref at the start of the first converter's pulse. This makes it incompatible with the condition for PFM control, which requires the output voltage to fall below the reference Vref to trigger the start of a pulse. Note that this incompatibility of ideal interleaving with PFM control merely occurs under specific cases of Vin, Vout, load current and number of interleaved phases.

Figure 5:
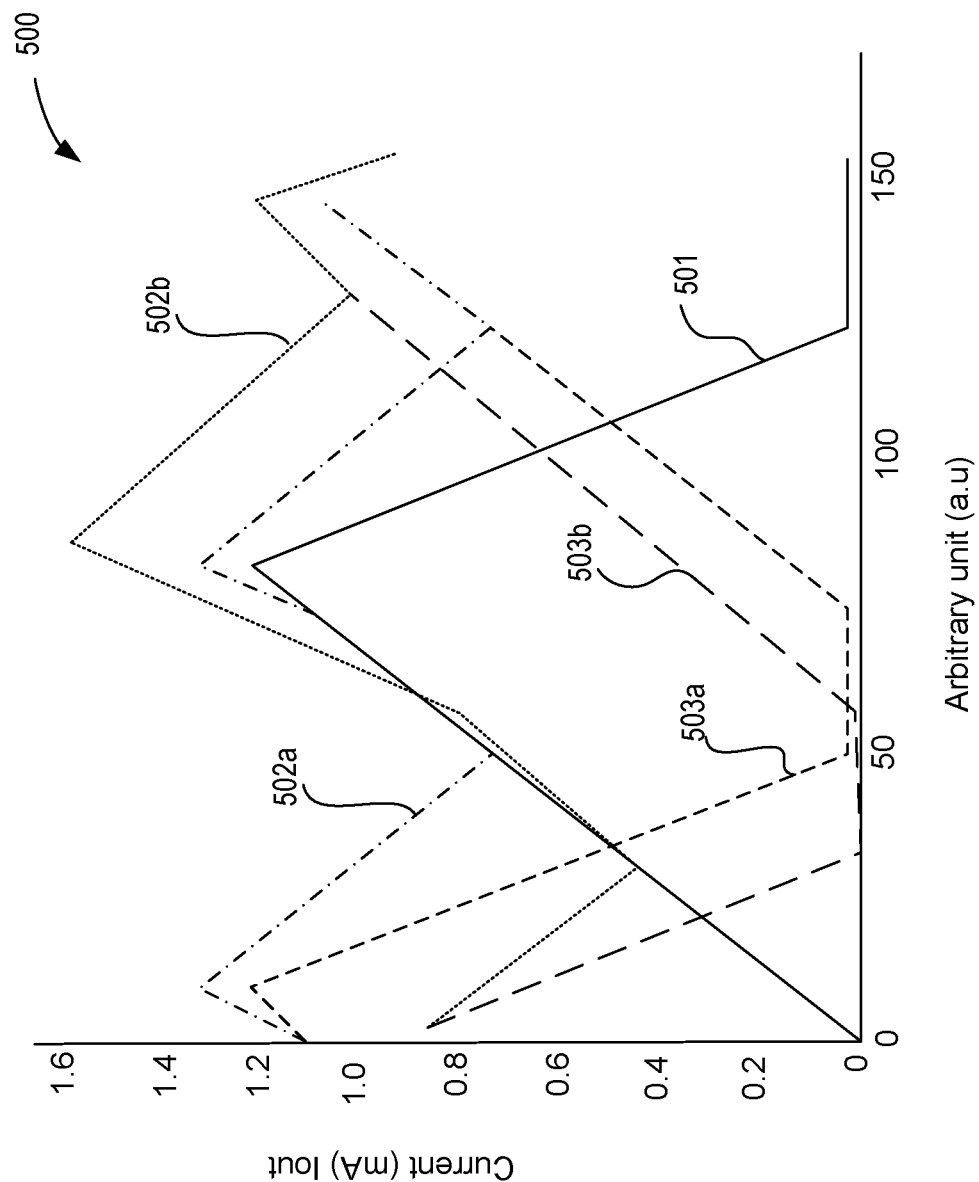
FIG. 5 illustrates a plot showing output current waveforms for different 2-phase interleaving cases.

FIG. 5 illustrates plot 500 showing output current waveforms for different 2-phase interleaving cases. The current through each interleaved converter for the two non-zero phase offset cases in plot 400 is shown in plot 500. In this example, the converter needs to supply 1A of total current. The current from the master bridge is shown as 501, the total current is shown as 502a/b, where, 502a is with ideal interleaving (e.g., $0.5*T_{period}$ based offset) and 502b is with $0.375*T_{period}$ based offset, and current from bridge which is interleaved is shown by 503a/b, where, 503a is with $0.5*T_{period}$ based offset and 503b is with $0.375*T_{period}$ based offset.

Under ideal interleaving, the total current 502a at the start of the first converter pulse is larger than the load current, which causes the output voltage Vout to rise above the reference. The total current 502b, in the other case, at the start of the first converter's pulse is below the load current, which means the output voltage Vout falls below the reference Vref.

For a set of interleaved converters operating in DCM with PFM control, the conditions where ideal interleaving may or may not be employed depends on the operating conditions. The operating conditions can be computed in real-time using a variety of approaches.

In one approach, the input voltage, output voltage, peak current and inductance value can be used to mathematically compute the inductor current waveform. This, combined with the measured switching period and number of phases being used, can be used to compute the total current waveform as well as the load current. The total current waveform can be used to adjust the interleaving phase delays to make it PFM-compliant.

In another approach, based on the computed switching period, ideal interleaving can be enabled for one cycle. At the end of the cycle, a comparator can be used on the output voltage to sense if it is rising or falling with respect to the reference. If the output voltage is rising, the interleaving delay can be adjusted to make it PFM-compliant.

In another approach, a safety factor can be applied to the interleaving in all conditions to make it unconditionally PFM-compliant. In one example, by backing off to 50% of the ideal interleaving phase delays, the converter can be made unconditionally PFM-compliant. A comparator compares the output voltage to a droop threshold, which is lower than the reference for PFM control or lower than the hysteresis levels for a hysteretic controller. Once the output voltage falls below the droop threshold, all the available phases need to be enabled.

Figure 6:
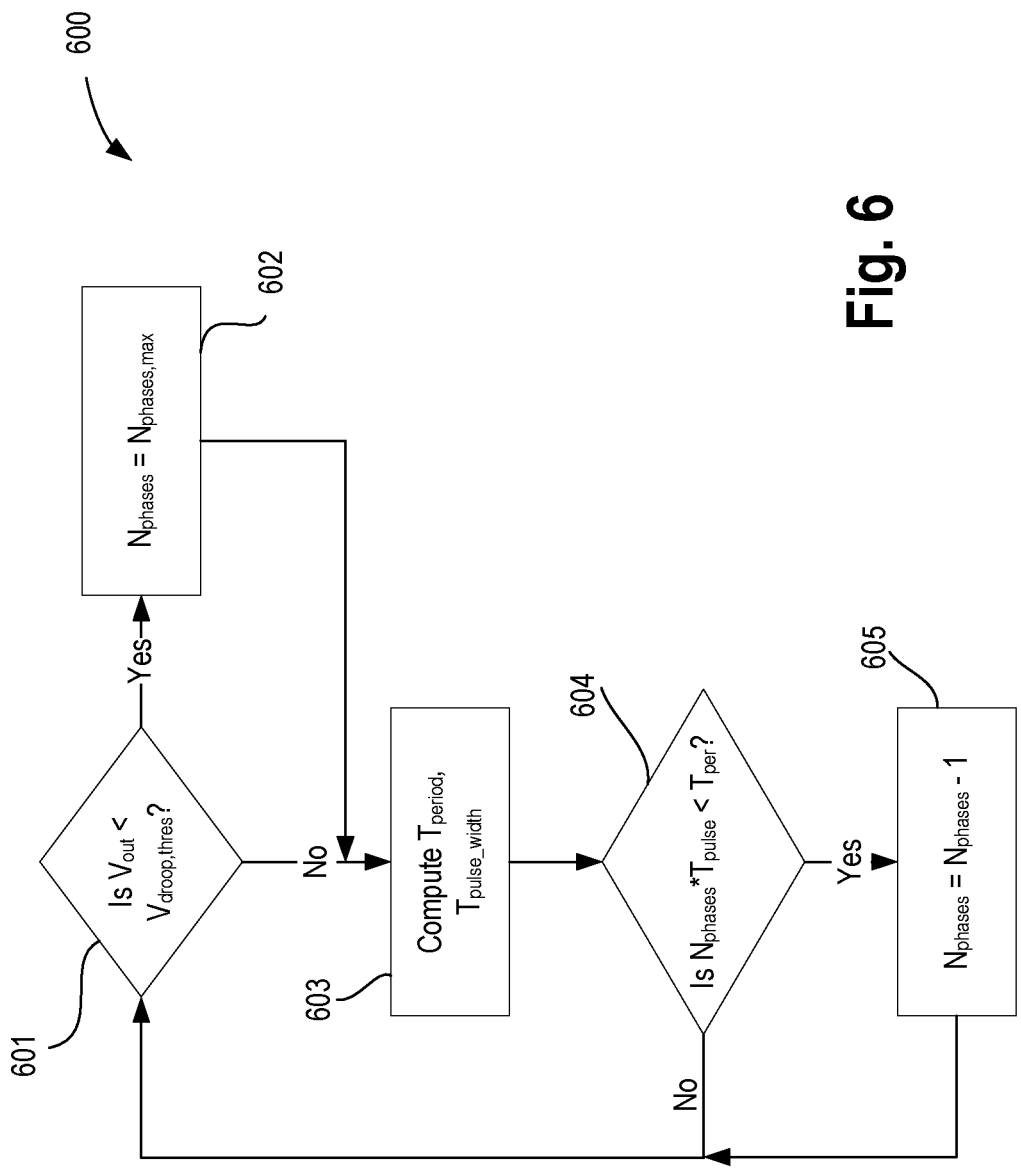
FIG. 6 illustrates a flowchart of a method for computing a number of bridges (of DC-DC converters) to be enabled in pulse frequency modulated supply regulation, in accordance with some embodiments.

FIG. 6 illustrates flowchart 600 of a method for computing a number of bridges (of DC-DC converters) to be enabled in pulse frequency modulated supply regulation, in accordance with some embodiments. Flowchart 600 illustrates a scheme to control the number of phases (or bridges) enabled for an interleaved converter operating with a PFM controller.

At block 601, a determination is made whether Vout is less than the droop threshold ($V_{droop, thresh}$). After the droop threshold is hit, the process proceeds to block 602 where the converter is allowed to run with all interleaved bridges firing without any phase offsets for a few cycles to estimate the switching period and inductor current pulse width. In this case, $N_{phases}=N_{phases, max}$. Once a stable set of estimates are arrived at, the system checks if the total pulse-width of all the units combined is lesser than the switching period. For that, the process proceeds to block 603 when Vout falls below the droop threshold ($V_{droop, thresh}$). At block 603, $T_{period}$ and $T_{pulse}$ are determined as discussed with reference to FIGS. 1-2.

Referring back to FIG. 6, the process them proceeds to block 604. At 604, a determination is made whether, the total pulse-width $T_{pulse}$ of all the units combined is lesser than the switching period $T_{period}$ of the data drive signal (e.g., gate drive 1). If it is, the process proceeds to block 605. Otherwise, the process proceeds to block 601. At block 605, decrementing the number of interleaved bridges may still allow the converter to deliver the required load current. The system keeps repeating this until an optimal number of interleaved phases is reached. This allows the converter to arrive at the optimal number of phases without the need for a current sensor. Flowchart 600 can be implemented in Interleaving delay compute circuitry 204.

Figure 7:
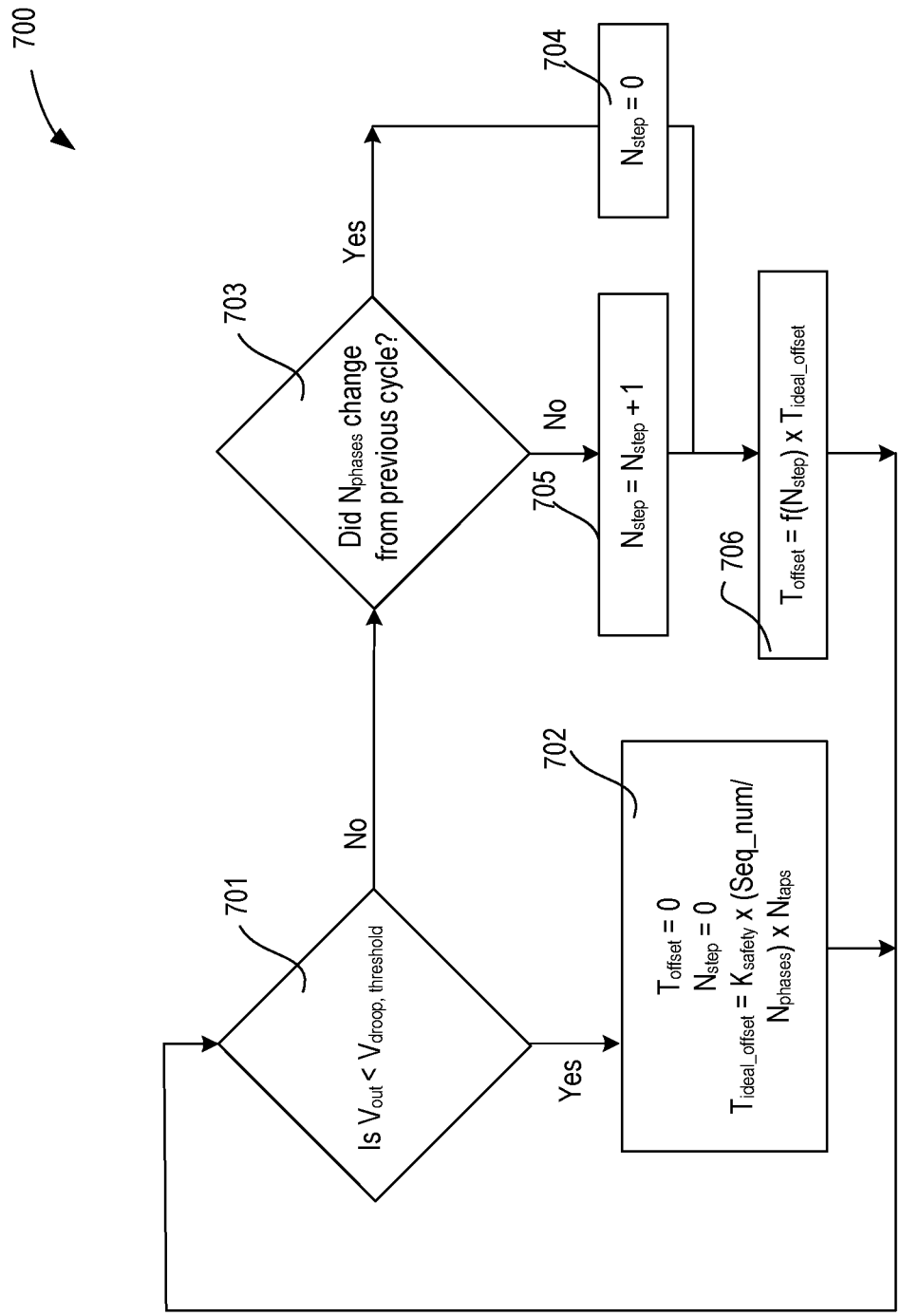
FIG. 7 illustrates a flowchart of a method for determining the phase offset for optimized interleaving, in accordance with some embodiments.

FIG. 7 illustrates flowchart 700 of a method for determining the phase offset ($T_{offset}$) for optimized interleaving, in accordance with some embodiments. In this example, each slave converter has its own delay-line, which uses the same delay setting as the delay-line for the master converter, and also uses the same gate drive signal as input used by the master converter. $T_{offset}$ sets which tap needs to be selected from the delay line to drive the high-side switch MP1 of a bridge.

At block 701, a determination is made about $V_{out}$ compared to the droop threshold voltage level, $V_{droop,\ threshold}$. If the voltage of Vout is less then $V_{droop,\ threshold}$, the process proceeds to block 702. If the voltage of $V_{out}$ is greater or equal to $V_{droop,\ threshold}$, the process proceeds to block 703.

At block 702, $T_{offset}$ and $N_{step}$ is set to 0, where $N_{step}$ is a counter value that is used to slowly increase the phase offsets of the interleaved phases (or bridges) to their final value. Typically, all the operational phases would be at the same Nstep at a given point in time. When $N_{step}=0$, the first slave bridge (e.g., bridge 101$_2$ is enabled). In this approach, a safety factor $K_{safety}$ is applied to the interleaving in all conditions to make it unconditionally PFM-compliant. Here, "seq_num" indicates a sequence number of a slave module or converter, and it indicates a position of a slave module among other slave converters. In one example, by backing off to 50% of the ideal interleaving phase delays the converter can be made unconditionally PFM-compliant. After setting $T_{offset}$, $N_{step}$, and $T_{final\_offset}$, the process proceeds back to 701.

At block 703 (when the voltage of $V_{out}$ is greater or equal to $V_{droop,\ threshold}$), a determination is made about the number of active bridges or phases. If the number of bridges or phases (e.g., $N_{phases}$) that are enabled changes from the previous process cycle, then the process proceeds to block 704. If the number of bridges or phases (e.g., $N_{phases}$) that are enabled remains the same, then the process proceeds to block 705. At block 704, $N_{step}$ is set to 0, and the process proceeds to block 706 where $T_{offset}$ for the bridge is set. In this case, $T_{offset}$ is adjusted to reduce voltage ripple. Here, f(i) is a function that starts at 0 for i<=0 and monotonically increases and saturates at 1 as 'i' increases. The process then proceeds to block 701. At block 705 (when the number of bridges or phases (e.g., $N_{phases}$) that are enabled remains the same), $N_{step}$ is incremented by one. When $N_{step}$ is incremented, $T_{offset}$ between phases is increased to slowly approach the $T_{ideal\_offset}$ (ideal offset). The process then proceeds to block 706 where $T_{offset}$ for the bridge is set according to the updated $N_{step}$ value. When loading condition changes or ripple in output voltage Vout increases, more phases (or bridges) may need to be turned on. The process then proceeds to block 701.

Figure 8:
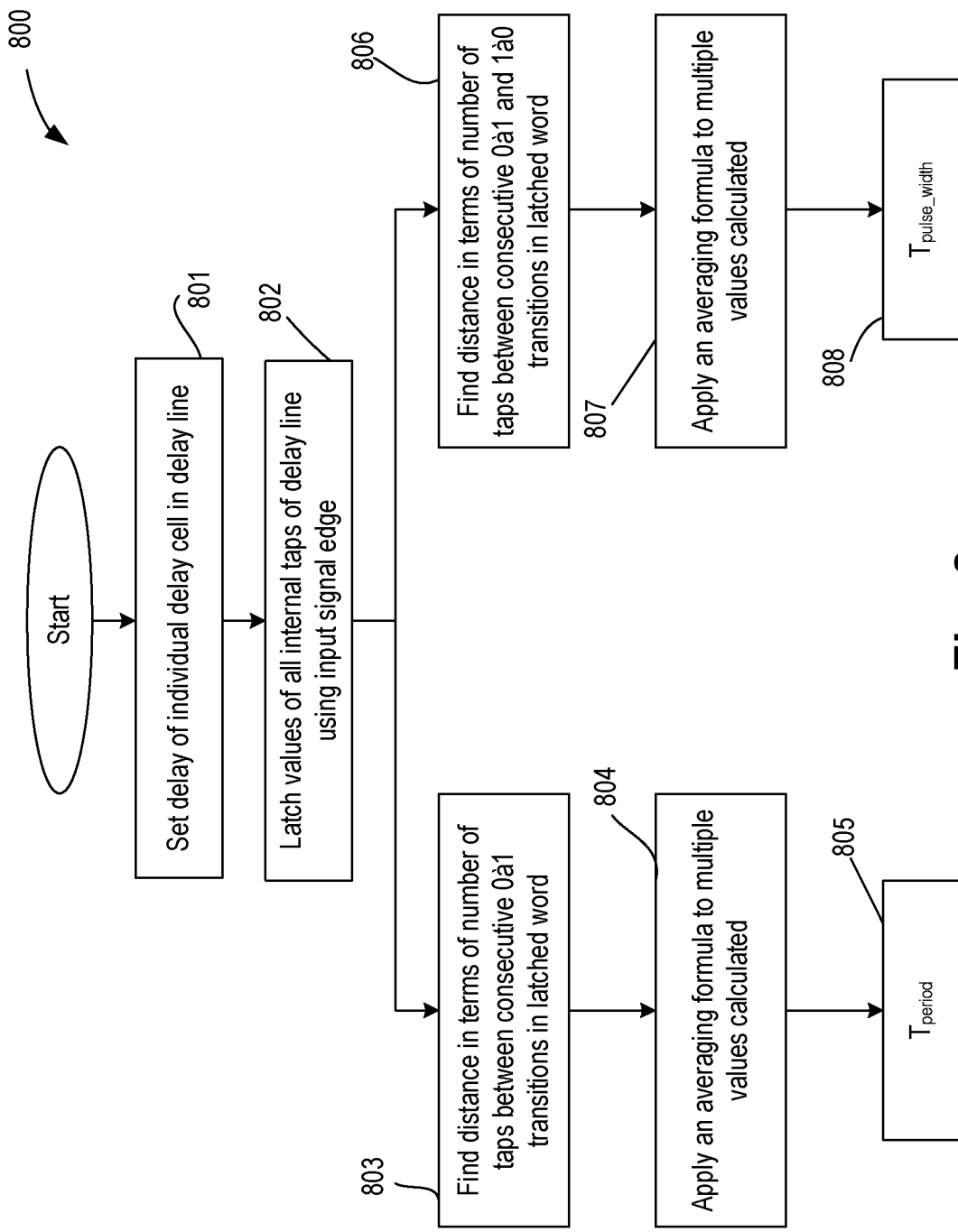
FIG. 8 illustrates a flowchart of a method for computing pulse train period and pulse width for optimized interleaving, in accordance with some embodiments.

FIG. 8 illustrates flowchart 800 of a method for computing pulse train period and pulse width for optimized interleaving, in accordance with some embodiments. $T_{period}$ and $T_{pulse-width}$ can be computed in parallel or sequentially in any order. At block 801, delay for each delay cell 201$_{1-N}$ is set. For example, Vctl power supply voltage level is set for the delay cells 305. At block 802, flip-flops 202$_{1-N}$ latch the input (or output) of the delay cells 2011$_{-N}$. At block 803, distance in terms of number of delay cell taps between consecutive 0 to 1 transitions in latched output word is determined. This distance indicates the period of the input drive signal which is put to delay line 201. At block 804, the determined distance is filtered by applying an averaging formula to the various distances determined in terms of number of delay cell taps between consecutive 0 to 1 transitions in latched output word. The filtered output, as indicated by block 805, is the $T_{period}$, which is then used to compute the phase offsets for the other bridges. The process of determining pulse width is illustrated by blocks 806 through 808. At block 806, the distance in terms of number of delay cell taps between consecutive 0 to 1 and 1 to 0 transitions in the latched output word of the flip-flops 202 is determined. This distance indicates the pulse width of the gate drive signal 1 (e.g., the master gate drive signal). At block 807, the determined distance is filtered by applying an averaging formula to the various distances determined in terms of number of delay cell taps between consecutive 0 to 1 and 1 to 0 transitions in the latched output word. The filtered output, as indicated by block 808, is the $T_{pulse\_width}$, which is then used to compute the phase offsets for the other bridges. Part of flowchart 800 can be implemented in Interleaving delay compute circuitry 204.

Figure 9:
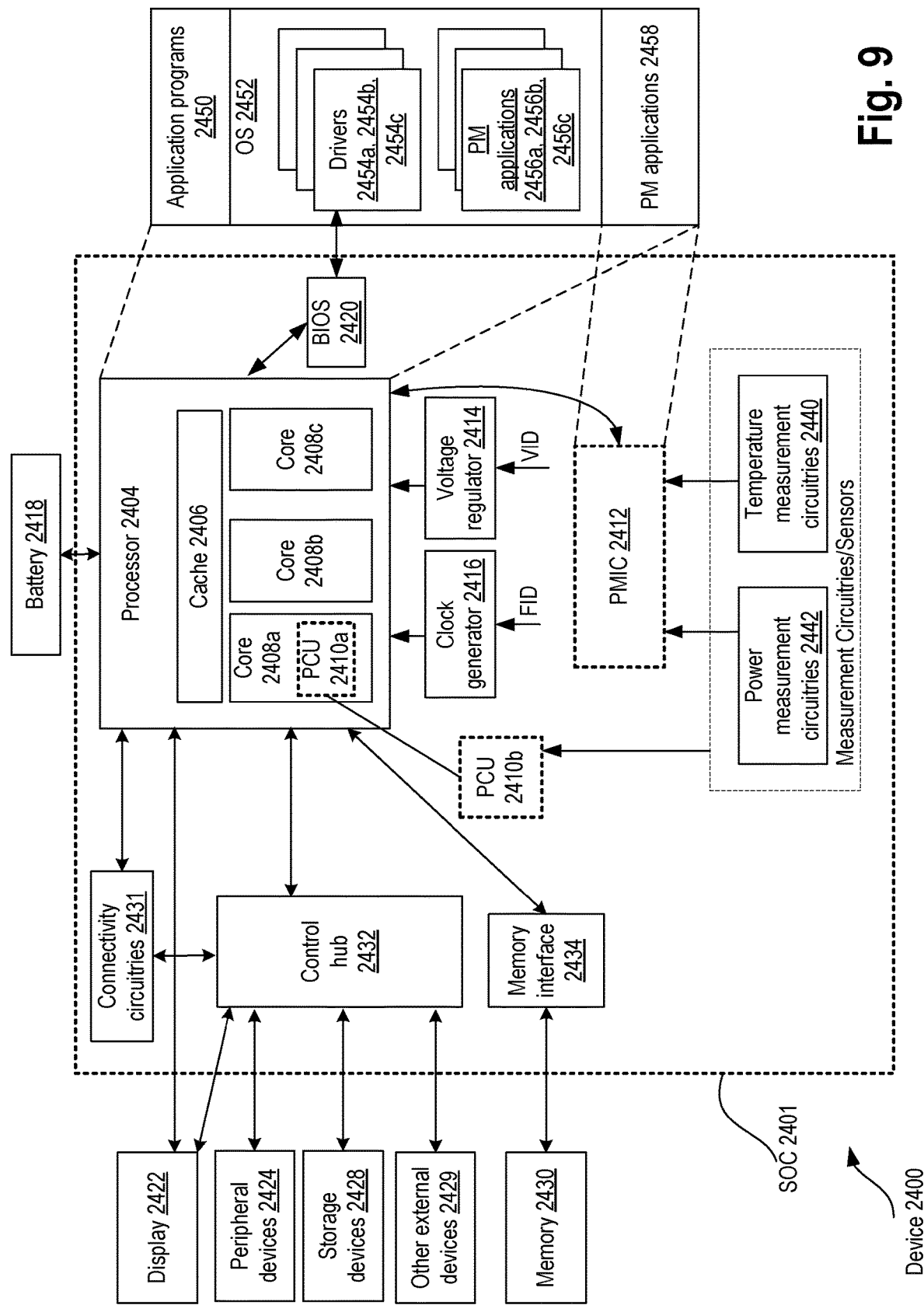
FIG. 9 illustrates a smart device, a computer system, or a SoC (System-on-Chip) multi-phase DC-DC converter with real-time switching period estimation for appropriate or optimized interleaving, according to some embodiments of the disclosure.

FIG. 9 illustrates a smart device or a computer system or a SoC (System-on-Chip) multi-phase DC-DC converter with real-time switching period estimation for appropriate or optimized interleaving, according to some embodiments of the disclosure.

In some embodiments, computing device 2400 represents a mobile computing device, such as a computing tablet, a mobile phone or smart-phone, a wireless-enabled e-reader, or other wireless mobile device. It will be understood that certain components are shown generally, and not all components of such a device are shown in computing device 2400. Any of the blocks herein can have the multi-phase DC-DC converter with real-time switching period estimation for appropriate or optimized interleaving.

In some embodiments, device 2400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2400.

In an example, the device 2400 comprises a SoC (System-on-Chip) 2401. An example boundary of the SOC 2401 is illustrated using dotted lines in FIG. 9, with some example components being illustrated to be included within SOC 2401—however, SOC 2401 may include any appropriate components of device 2400.

In some embodiments, device 2400 includes processor 2404. Processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting computing device 2400 to another device, and/or the like. The processing operations may also include operations related to audio I/O and/or display I/O.

In some embodiments, processor 2404 includes multiple processing cores (also referred to as cores) 2408a, 2408b, 2408c. Although merely three cores 2408a, 2408b, 2408c are illustrated in FIG. 1, the processor 2404 may include any other appropriate number of processing cores, e.g., tens, or even hundreds of processing cores. Processor cores 2408a, 2408b, 2408c may be implemented on a single integrated circuit (IC) chip. Moreover, the chip may include one or more shared and/or private caches, buses or interconnections, graphics and/or memory controllers, or other components.

In some embodiments, processor 2404 includes cache 2406. In an example, sections of cache 2406 may be dedicated to individual cores 2408 (e.g., a first section of cache 2406 dedicated to core 2408*a*, a second section of cache 2406 dedicated to core 2408*b*, and so on). In an example, one or more sections of cache 2406 may be shared among two or more of cores 2408. Cache 2406 may be split in different levels, e.g., level 1 (L1) cache, level 2 (L2) cache, level 3 (L3) cache, etc.

In some embodiments, processor core 2404 may include a fetch unit to fetch instructions (including instructions with conditional branches) for execution by the core 2404. The instructions may be fetched from any storage devices such as the memory 2430. Processor core 2404 may also include a decode unit to decode the fetched instruction. For example, the decode unit may decode the fetched instruction into a plurality of micro-operations. Processor core 2404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 2404 may be an out-of-order processor core in one embodiment. Processor core 2404 may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 2404 may also include a bus unit to enable communication between components of the processor core 2404 and other components via one or more buses. Processor core 2404 may also include one or more registers to store data accessed by various components of the core 2404 (such as values related to assigned app priorities and/or sub-system states (modes) association.

In some embodiments, device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable device 2400 to communicate with external devices. Device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, cell phone or personal digital assistant.

In some embodiments, device 2400 comprises control hub 2432, which represents hardware devices and/or software components related to interaction with one or more I/O devices. For example, processor 2404 may communicate with one or more of display 2422, one or more peripheral devices 2424, storage devices 2428, one or more other external devices 2429, etc., via control hub 2432. Control hub 2432 may be a chipset, a Platform Control Hub (PCH), and/or the like.

For example, control hub 2432 illustrates one or more connection points for additional devices that connect to device 2400, e.g., through which a user might interact with the system. For example, devices (e.g., devices 2429) that can be attached to device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of device 2400. Additionally, audio output can be provided instead of, or in addition to display output. In another example, if display 2422 includes a touch screen, display 2422 also acts as an input device, which can be at least partially managed by control hub 2432. There can also be additional buttons or switches on computing device 2400 to provide I/O functions managed by control hub 2432. In one embodiment, control hub 2432 manages devices such as accelerometers, cameras, light sensors or other environmental sensors, or other hardware that can be included in device 2400. The input can be part of direct user interaction, as well as providing environmental input to the system to influence its operations (such as filtering for noise, adjusting displays for brightness detection, applying a flash for a camera, or other features).

In some embodiments, control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2422 represents hardware (e.g., display devices) and software (e.g., drivers) components that provide a visual and/or tactile display for a user to interact with device 2400. Display 2422 may include a display interface, a display screen, and/or hardware device used to provide a display to a user. In some embodiments, display 2422 includes a touch screen (or touch pad) device that provides both output and input to a user. In an example, display 2422 may communicate directly with the processor 2404. Display 2422 can be one or more of an internal display device, as in a mobile electronic device or a laptop device or an external display device attached via a display interface (e.g., DisplayPort, etc.). In one embodiment display 2422 can be a head mounted display (HMD) such as a stereoscopic display device for use in virtual reality (VR) applications or augmented reality (AR) applications.

In some embodiments and although not illustrated in the figure, in addition to (or instead of) processor 2404, device 2400 may include Graphics Processing Unit (GPU) comprising one or more graphics processing cores, which may control one or more aspects of displaying contents on display 2422.

Control hub 2432 (or platform controller hub) may include hardware interfaces and connectors, as well as software components (e.g., drivers, protocol stacks) to make peripheral connections, e.g., to peripheral devices 2424.

It will be understood that device 2400 could both be a peripheral device to other computing devices, as well as have peripheral devices connected to it. Device 2400 may have a "docking" connector to connect to other computing devices for purposes such as managing (e.g., downloading and/or uploading, changing, synchronizing) content on device 2400. Additionally, a docking connector can allow device 2400 to connect to certain peripherals that allow computing device 2400 to control content output, for example, to audiovisual or other systems.

In addition to a proprietary docking connector or other proprietary connection hardware, device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2431 may be coupled to control hub 2432, e.g., in addition to, or instead of, being coupled directly to the processor 2404. In some embodiments, display 2422 may be coupled to control hub 2432, e.g., in addition to, or instead of, being coupled directly to processor 2404.

In some embodiments, device 2400 comprises memory 2430 coupled to processor 2404 via memory interface 2434. Memory 2430 includes memory devices for storing information in device 2400. Memory can include nonvolatile (state does not change if power to the memory device is interrupted) and/or volatile (state is indeterminate if power to the memory device is interrupted) memory devices. Memory device 2430 can be a dynamic random access memory (DRAM) device, a static random access memory (SRAM) device, flash memory device, phase-change memory device, or some other memory device having suitable performance to serve as process memory. In one embodiment, memory 2430 can operate as system memory for device 2400, to store data and instructions for use when the one or more processors 2404 executes an application or process. Memory 2430 can store application data, user data, music, photos, documents, or other data, as well as system data (whether long-term or temporary) related to the execution of the applications and functions of device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2400 comprises temperature measurement circuitries 2440, e.g., for measuring temperature of various components of device 2400. In an example, temperature measurement circuitries 2440 may be embedded, or coupled or attached to various components, whose temperature are to be measured and monitored. For example, temperature measurement circuitries 2440 may measure temperature of (or within) one or more of cores 2408*a*, 2408*b*, 2408*c*, voltage regulator 2414, memory 2430, a mother-board of SOC 2401, and/or any appropriate component of device 2400.

In some embodiments, device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, power measurement circuitries 2442 may measure power, current and/or voltage supplied by one or more voltage regulators 2414, power supplied to SOC 2401, power supplied to device 2400, power consumed by processor 2404 (or any other component) of device 2400, etc.

In some embodiments, device 2400 comprises one or more voltage regulator circuitries, generally referred to as voltage regulator (VR) 2414. VR 2414 generates signals at appropriate voltage levels, which may be supplied to operate any appropriate components of the device 2400. Merely as an example, VR 2414 is illustrated to be supplying signals to processor 2404 of device 2400. In some embodiments, VR 2414 receives one or more Voltage Identification (VID) signals, and generates the voltage signal at an appropriate level, based on the VID signals. Various type of VRs may be utilized for the VR 2414. For example, VR 2414 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 2410*a/b* and/or PMIC 2412. In some embodiments, each core has a network of distributed LDOs to provide efficient control for power management. The LDOs can be digital, analog, or a combination of digital or analog LDOs.

In some embodiments, device 2400 comprises one or more clock generator circuitries, generally referred to as clock generator 2416. Clock generator 2416 generates clock signals at appropriate frequency levels, which may be supplied to any appropriate components of device 2400. Merely as an example, clock generator 2416 is illustrated to be supplying clock signals to processor 2404 of device 2400. In some embodiments, clock generator 2416 receives one or more Frequency Identification (FID) signals, and generates the clock signals at an appropriate frequency, based on the FID signals.

In some embodiments, device 2400 comprises battery 2418 supplying power to various components of device 2400. Merely as an example, battery 2418 is illustrated to be supplying power to processor 2404. Although not illustrated in the figures, device 2400 may comprise a charging circuitry, e.g., to recharge the battery, based on Alternating Current (AC) power supply received from an AC adapter.

In some embodiments, device 2400 comprises Power Control Unit (PCU) 2410 (also referred to as Power Management Unit (PMU), Power Controller, etc.). In an example, some sections of PCU 2410 may be implemented by one or more processing cores 2408, and these sections of PCU 2410 are symbolically illustrated using a dotted box and labelled PCU 2410a. In an example, some other sections of PCU 2410 may be implemented outside the processing cores 2408, and these sections of PCU 2410 are symbolically illustrated using a dotted box and labelled as PCU 2410b. PCU 2410 may implement various power management operations for device 2400. PCU 2410 may include hardware interfaces, hardware circuitries, connectors, registers, etc., as well as software components (e.g., drivers, protocol stacks), to implement various power management operations for device 2400.

In some embodiments, device 2400 comprises Power Management Integrated Circuit (PMIC) 2412, e.g., to implement various power management operations for device 2400. In some embodiments, PMIC 2412 is a Reconfigurable Power Management ICs (RPMICs) and/or an IMVP (Intel® Mobile Voltage Positioning). In an example, the PMIC is within an IC chip separate from processor 2404. The may implement various power management operations for device 2400. PMIC 2412 may include hardware interfaces, hardware circuitries, connectors, registers, etc., as well as software components (e.g., drivers, protocol stacks), to implement various power management operations for device 2400.

In an example, device 2400 comprises one or both PCU 2410 or PMIC 2412. In an example, any one of PCU 2410 or PMIC 2412 may be absent in device 2400, and hence, these components are illustrated using dotted lines.

Various power management operations of device 2400 may be performed by PCU 2410, by PMIC 2412, or by a combination of PCU 2410 and PMIC 2412. For example, PCU 2410 and/or PMIC 2412 may select a power state (e.g., P-state) for various components of device 2400. For example, PCU 2410 and/or PMIC 2412 may select a power state (e.g., in accordance with the ACPI (Advanced Configuration and Power Interface) specification) for various components of device 2400. Merely as an example, PCU 2410 and/or PMIC 2412 may cause various components of the device 2400 to transition to a sleep state, to an active state, to an appropriate C state (e.g., C0 state, or another appropriate C state, in accordance with the ACPI specification), etc. In an example, PCU 2410 and/or PMIC 2412 may control a voltage output by VR 2414 and/or a frequency of a clock signal output by the clock generator, e.g., by outputting the VID signal and/or the FID signal, respectively. In an example, PCU 2410 and/or PMIC 2412 may control battery power usage, charging of battery 2418, and features related to power saving operation.

The clock generator 2416 can comprise a phase locked loop (PLL), frequency locked loop (FLL), or any suitable clock source. In some embodiments, each core of processor 2404 has its own clock source. As such, each core can operate at a frequency independent of the frequency of operation of the other core. In some embodiments, PCU 2410 and/or PMIC 2412 performs adaptive or dynamic frequency scaling or adjustment. For example, clock frequency of a processor core can be increased if the core is not operating at its maximum power consumption threshold or limit. In some embodiments, PCU 2410 and/or PMIC 2412 determines the operating condition of each core of a processor, and opportunistically adjusts frequency and/or power supply voltage of that core without the core clocking source (e.g., PLL of that core) losing lock when the PCU 2410 and/or PMIC 2412 determines that the core is operating below a target performance level. For example, if a core is drawing current from a power supply rail less than a total current allocated for that core or processor 2404, then PCU 2410 and/or PMIC 2412 can temporality increase the power draw for that core or processor 2404 (e.g., by increasing clock frequency and/or power supply voltage level) so that the core or processor 2404 can perform at higher performance level. As such, voltage and/or frequency can be increased temporality for processor 2404 without violating product reliability.

In an example, PCU 2410 and/or PMIC 2412 may perform power management operations, e.g., based at least in part on receiving measurements from power measurement circuitries 2442, temperature measurement circuitries 2440, charge level of battery 2418, and/or any other appropriate information that may be used for power management. To that end, PMIC 2412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor (s) may be directly coupled to PCU 2410 and/or PMIC 2412 in at least one embodiment to allow PCU 2410 and/or PMIC 2412 to manage processor core energy at least in part based on value(s) detected by one or more of the sensors.

Also illustrated is an example software stack of device 2400 (although not all elements of the software stack are illustrated). Merely as an example, processors 2404 may execute application programs 2450, Operating System 2452, one or more Power Management (PM) specific application programs (e.g., generically referred to as PM applications 2458), and/or the like. PM applications 2458 may also be executed by the PCU 2410 and/or PMIC 2412. OS 2452 may also include one or more PM applications 2456a, 2456b, 2456c. The OS 2452 may also include various drivers 2454a, 2454b, 2454c, etc., some of which may be specific for power management purposes. In some embodiments, device 2400 may further comprise a Basic Input/Output System (BIOS) 2420. BIOS 2420 may communicate with OS 2452 (e.g., via one or more drivers 2454), communicate with processors 2404, etc.

For example, one or more of PM applications 2458, 2456, drivers 2454, BIOS 2420, etc. may be used to implement power management specific tasks, e.g., to control voltage and/or frequency of various components of device 2400, to control wake-up state, sleep state, and/or any other appropriate power state of various components of device 2400, control battery power usage, charging of the battery 2418, features related to power saving operation, etc.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The embodiments are illustrated with reference to the following examples. These examples can be combined with other examples in any suitable manner Example 1: An apparatus comprising: a delay-line including a plurality of delay stages, wherein the plurality of delay stages include first, second, and third delay stages, wherein the first delay stage includes an input and an output, wherein the input is to receive a switchable signal, and wherein the output of the first delay stage is coupled to an input of the second delay stage, and wherein the third delay stage is coupled to an output of the second delay stage; a first sequential circuitry having a data input coupled to the input of the first delay stage; a second sequential circuitry having a data input coupled to the output of the first delay stage; a third sequential circuitry having a data input coupled to an output of the third delay stage; a multiplexer coupled to the data inputs of the first, second, and third delay stages; and a circuitry to receive outputs of the first, second, and third sequential circuitries, and to generate a select signal for the multiplexer.

Example 2: The apparatus of example 1 comprises a clock line coupled to the first, second, and third sequential circuitries.

Example 3: The apparatus of example 1, wherein the switchable signal is to control on and off behavior of high-side and low-side switches of a DC-DC converter.

Example 4: The apparatus of example 3, wherein the DC-DC converter is a first DC-DC converter, wherein the switchable signal is a first switchable signal, and wherein an output of the multiplexer is a second switchable signal for a second DC-DC converter.

Example 5: The apparatus of example 4, wherein the second switchable signal is offset in time relative to the first switchable signal.

Example 6: The apparatus of example 4 comprises: a first inductor coupled to an output of the first DC-DC converter; and a second inductor coupled to an output of the second DC-DC converter, wherein the first and second inductors are coupled to a power supply rail.

Example 7: The apparatus of example 1, wherein an individual delay stage of the plurality of delay stages includes: a first flip-flop having a clock input coupled to an input of the individual delay stage; a second flip-flop having a clock input coupled to an inverse of the input of the individual delay stage; a combinational logic coupled to outputs of the first and second flip-flops; a plurality of series coupled inverters, wherein a first inverter of the plurality of series coupled inverters is coupled to an output of the combinational logic; and a third flip-flop coupled to an output of a last inverter of the plurality of series coupled inverters.

Example 8: The apparatus of example 7, wherein data inputs of the first and second flip-flops are coupled to a fixed input.

Example 9: The apparatus of example 7, wherein the third flip-flop has a data input coupled to the input of the individual delay stage.

Example 10: The apparatus of example 7, wherein a buffered version of the output of the last inverter is coupled to reset inputs of the first and second flip-flops.

Example 11: The apparatus of example 7, wherein an output of the third flip-flop is an output of the individual delay stage.

Example 12: An apparatus comprising: an input power supply rail; an output power supply rail; a first DC-DC converter coupled to the input power supply rail and a first inductor, wherein the first DC-DC converter is to receive a first switchable signal, and wherein the first inductor is coupled to the output power supply rail; a second DC-DC converter coupled to the input power supply rail and a second inductor, wherein the second DC-DC converter is to receive a second switchable signal, wherein the second inductor is coupled to the output power supply rail; a third DC-DC converter coupled to the input power supply rail and a third inductor, wherein the third DC-DC converter is to receive a third switchable signal, wherein the third inductor is coupled to the output power supply rail; and circuitry and logic to determine period of the first switching signal, and to determine first offset and second offset for the second and third switchable signals according to the period of the first switchable signal.

Example 13: The apparatus of example 12, wherein circuitry and logic includes: a delay-line including a plurality of delay stages, wherein the plurality of delay stages include first, second, and third delay stages, wherein the first delay stage includes an input and an output, wherein the input is to receive the first switchable signal, and wherein the output of the first delay stage is coupled to an input of the second delay stage, and wherein the third delay stage is coupled to an output of the second delay stage.

Example 14: The apparatus of example 13, wherein the circuitry and logic includes: a first sequential circuitry having a data input coupled to the input of the first delay stage; a second sequential circuitry having a data input coupled to the output of the first delay stage; and a third sequential circuitry having a data input coupled to an output of the third delay stage.

Example 15: The apparatus of example 14, wherein the circuitry and logic includes a multiplexer coupled to the data inputs of the first, second, and third delay stages.

Example 16: The apparatus of example 14, wherein the circuitry and logic includes circuitry to receive outputs of the first, second, and third sequential circuitries, and to generate a select signal for the multiplexer.

Example 17: A system comprising: a memory; a processor core coupled to the memory, wherein the processor core includes: an input power supply rail; an output power supply rail; a first DC-DC converter coupled to the input power supply rail and a first inductor, wherein the first DC-DC converter is to receive a first switchable signal, and wherein the first inductor is coupled to the output power supply rail; a second DC-DC converter coupled to the input power supply rail and a second inductor, wherein the second DC-DC converter is to receive a second switchable signal, wherein the second inductor is coupled to the output power supply rail; a third DC-DC converter coupled to the input power supply rail and a third inductor, wherein the third DC-DC converter is to receive a third switchable signal, wherein the third inductor is coupled to the output power supply rail; and circuitry and logic to determine period of the first switching signal, and to determine first offset and second offset for the second and third switchable signals according to the period of the first switchable signal; and a wireless interface to allow the processor core to communicate with another device.

Example 18: The system of example 17, wherein circuitry and logic includes: a delay-line including a plurality of delay stages, wherein the plurality of delay stages include first, second, and third delay stages, wherein the first delay stage includes an input and an output, wherein the input is to receive the first switchable signal, and wherein the output of the first delay stage is coupled to an input of the second delay stage, and wherein the third delay stage is coupled to an output of the second delay stage.

Example 19: The system of example 18, wherein the circuitry and logic includes: a first sequential circuitry having a data input coupled to the input of the first delay stage; a second sequential circuitry having a data input coupled to the output of the first delay stage; and a third sequential circuitry having a data input coupled to an output of the third delay stage.

Example 20: The system of example 19, wherein the circuitry and logic includes a multiplexer coupled to the data inputs of the first, second, and third delay stages, and wherein the circuitry and logic includes circuitry to receive outputs of the first, second, and third sequential circuitries, and to generate a select signal for the multiplexer.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
    a delay-line including a plurality of delay stages, wherein the plurality of delay stages includes first, second, and third delay stages, wherein the first delay stage includes an input and an output, wherein the input is to receive a first switchable signal, wherein the first switchable signal is to control on and off behavior of high-side and low-side switches of a first DC-DC converter; wherein the output of the first delay stage is coupled to an input of the second delay stage, and wherein the third delay stage is coupled to an output of the second delay stage;
    a first sequential circuitry having a data input coupled to the input of the first delay stage;
    a second sequential circuitry having a data input coupled to the output of the first delay stage;
    a third sequential circuitry having a data input coupled to an output of the second delay stage;
    a multiplexer coupled to the data inputs of the first, second, and third delay stages, wherein an output of the multiplexer is a second switchable signal for a second DC-DC converter; and
    a circuitry to receive outputs of the first, second, and third sequential circuitries, and to generate a select signal for the multiplexer.

2. The apparatus of claim 1, comprising a clock line coupled to the first, second, and third sequential circuitries.

3. The apparatus of claim 1, wherein the second switchable signal is offset in time relative to the first switchable signal.

4. The apparatus of claim 1, comprising:
    a first inductor coupled to an output of the first DC-DC converter; and
    a second inductor coupled to an output of the second DC-DC converter, wherein the first and second inductors are coupled to a power supply rail.

5. The apparatus of claim 1, wherein an individual delay stage of the plurality of delay stages includes:
    a first flip-flop having a clock input coupled to an input of the individual delay stage;
    a second flip-flop having a clock input coupled to an inverse of the input of the individual delay stage;
    a combinational logic coupled to outputs of the first and second flip-flops;
    a plurality of series coupled inverters, wherein a first inverter of the plurality of series coupled inverters is coupled to an output of the combinational logic; and
    a third flip-flop coupled to an output of a last inverter of the plurality of series coupled inverters.

6. The apparatus of claim 5, wherein data inputs of the first and second flip-flops are coupled to a fixed input.

7. The apparatus of claim 5, wherein the third flip-flop has a data input coupled to the input of the individual delay stage.

8. The apparatus of claim 5, wherein a buffered version of the output of the last inverter is coupled to reset inputs of the first and second flip-flops.

9. The apparatus of claim 5, wherein an output of the third flip-flop is an output of the individual delay stage.

10. An apparatus comprising:
   an input power supply rail;
   an output power supply rail;
   a first DC-DC converter coupled to the input power supply rail and a first inductor, wherein the first DC-DC converter is to receive a first switchable signal, and wherein the first inductor is coupled to the output power supply rail;
   a second DC-DC converter coupled to the input power supply rail and a second inductor, wherein the second DC-DC converter is to receive a second switchable signal, wherein the second inductor is coupled to the output power supply rail;
   a third DC-DC converter coupled to the input power supply rail and a third inductor, wherein the third DC-DC converter is to receive a third switchable signal, wherein the third inductor is coupled to the output power supply rail; and
   circuitry and logic to determine a period of the first switchable signal, and to determine a first offset and a second offset for the second and third switchable signals according to the period of the first switchable signal.

11. The apparatus of claim 10, wherein circuitry and logic includes:
   a delay-line including a plurality of delay stages, wherein the plurality of delay stages include first, second, and third delay stages, wherein the first delay stage includes an input and an output, wherein the input is to receive the first switchable signal, and wherein the output of the first delay stage is coupled to an input of the second delay stage, and wherein the third delay stage is coupled to an output of the second delay stage.

12. The apparatus of claim 11, wherein the circuitry and logic includes:
   a first sequential circuitry having a data input coupled to the input of the first delay stage;
   a second sequential circuitry having a data input coupled to the output of the first delay stage; and
   a third sequential circuitry having a data input coupled to an output of the third delay stage.

13. The apparatus of claim 12, wherein the circuitry and logic includes a multiplexer coupled to the data inputs of the first, second, and third delay stages.

14. The apparatus of claim 12, wherein the circuitry and logic includes circuitry to receive outputs of the first, second, and third sequential circuitries, and to generate a select signal for a multiplexer.

15. A system comprising:
   a memory;
   a processor core coupled to the memory, wherein the processor core includes:
      an input power supply rail;
      an output power supply rail;
      a first DC-DC converter coupled to the input power supply rail and a first inductor, wherein the first DC-DC converter is to receive a first switchable signal, and wherein the first inductor is coupled to the output power supply rail;
      a second DC-DC converter coupled to the input power supply rail and a second inductor, wherein the second DC-DC converter is to receive a second switchable signal, wherein the second inductor is coupled to the output power supply rail;
      a third DC-DC converter coupled to the input power supply rail and a third inductor, wherein the third DC-DC converter is to receive a third switchable signal, wherein the third inductor is coupled to the output power supply rail; and
      circuitry and logic to determine a period of the first switchable signal, and to determine a first offset and a second offset for the second and third switchable signals according to the period of the first switchable signal; and
   a wireless interface to allow the processor core to communicate with another device.

16. The system of claim 15, wherein circuitry and logic includes:
   a delay-line including a plurality of delay stages, wherein the plurality of delay stages include first, second, and third delay stages, wherein the first delay stage includes an input and an output, wherein the input is to receive the first switchable signal, and wherein the output of the first delay stage is coupled to an input of the second delay stage, and wherein the third delay stage is coupled to an output of the second delay stage.

17. The system of claim 16, wherein the circuitry and logic includes:
   a first sequential circuitry having a data input coupled to the input of the first delay stage;
   a second sequential circuitry having a data input coupled to the output of the first delay stage; and
   a third sequential circuitry having a data input coupled to an output of the third delay stage.

18. The system of claim 17, wherein the circuitry and logic includes a multiplexer coupled to the data inputs of the first, second, and third delay stages, and wherein the circuitry and logic includes circuitry to receive outputs of the first, second, and third sequential circuitries, and to generate a select signal for the multiplexer.

* * * * *